INVENTORS:
JÜRGEN ORTHMANN
RUDOLF PAULUS
BY Michael S. Striker
Attorney

INVENTORS:
JÜRGEN ORTHMANN
RUDOLF PAULUS
BY Michael S. Striker,
Attorney

United States Patent Office 3,497,611

Patented Feb. 24, 1970

3,497,611

ARRANGEMENT AND METHOD FOR ILLUMINATION CONTROL IN A COLOR PRINTER

Jurgen Orthmann and Rudolf Paulus, Munich, Germany, assignors to Agfa-Gevaert Aktiengesellschaft, Leverkusen, Germany Filed Sept. 26, 1967, Ser. No. 670,626
Claims priority, application Germany, Sept. 30, 1966, 53,630
Int. Cl. G03b 27/16
U.S. Cl. 178—5.2 17 Claims

ABSTRACT OF THE DISCLOSURE

Print material illuminated through a negative in three colors until the individual color illumination is stopped by corresponding subtractive filters. Movement of subtractive filters controlled by a system generating one signal as a function of individual illumination time, and second signal as function of density difference between the particular color and each of the two other colors. Subtractive filter moved into the light path when the corresponding color signal and the illumination time signal are equal. The control system is implemented by operational amplifiers.

BACKGROUND OF THE INVENTION

This invention relates to a method and an arrangement for controlling the illumination in a photo printer adapted to print a positive corresponding to a color negative on copy material sensitive to a plurality of colors. In general this plurality of colors will be the three primary colors. In particular this invention relates to an illumination control system wherein the amount of illumination in each of these three primary colors is separately regulated in dependence on the density of the negative in the corresponding color and in at least one of the two other colors.

In a known arrangement of this kind an undercorrection relative to the so-called neutral grey principle is effected in one color in dependence on the sum of the density in the other two colors.

SUMMARY OF THE INVENTION

It has been found that better results, compared to the above mentioned method and in particular a higher number of salable first copies, results when the undercorrection in one color is effected automatically in dependence on the difference between the negative density in the difference between the negative density in the corresponding color and in the two other colors.

The above constitutes the inventive idea basic to this subject invention. If, as is further proposed, the degree of dependence of the undercorrection is adjusted in such a manner as to keep the total print density constant and corresponding to the total negative density, then the operation of such a printer is considerably simplified. It is only necessary to determine whether one color is dominant in the negative, that is whether large areas of one color exist. If this is the case, a corresponding degree of undercorrection is chosen quite independent of the particular color. Instead of the conventional three color correction possibilities, it is now possible to activate only one key or one lever corresponding to the desired degree of undercorrection.

This invention thus relates to an illumination control system for a photo printer adapted to print a positive from a color negative on print material sensitive to a plurality of colors. The illumination control system comprises means for measuring the individual negative densities in each of a predetermined plurality of colors, for example the three primary colors, thus furnishing individual density values. Means are also provided for illuminating said copy material through said negative. The illumination control system according to this invention further comprises time signal generating means started synchronously with said illumination means and adapted to generate an illumination time signal. Means are provided for generating individual color signals at least in part as a function of the difference in negative density between the particular color and at least one of said other color. Means are also provided for comparing each of said individual color signals and said illumination time signal and generating a corresponding individual control signal whenever one of said individual color signals is equal to said elapsed time signal. Finally, means are provided for terminating the illumination in the corresponding color upon receipt of said individual control signal for said color.

DESCRIPTION OF THE PREFERRED EMBODIMENTS

According to this invention the time of illumination is determined in each of the three colors according to the following equations:

$$p_1 \log t_1 = N_1 - \log \theta_1 + C + a[\alpha_2(N_2 - N_1) + \alpha_3(N_3 - N_1)]$$

Since $$-Ni = \log I_1 + \log \theta_1$$

there results:

$$-\log i_1 = +Ni + \log \theta_1$$

and the equations take the following form for purposes of instrumentation:

$$p_1 \log t_1 + (1-a) \log i_1 + a(\alpha_1 \log i_1 + \alpha_2 \log i_2 + \alpha_3 \log i_3) - a(\alpha_1 \log \theta_1 + \alpha_2 \log \theta_2 + \alpha_3 \log \theta_3) + a \log \theta_1 - C = 0$$

wherein:

$p_1$ is the Schwarzschild exponent,
$t_1$ is the necessary time of illumination,
$N_1$ is the density of the negative,
$\theta_1$ is the brightness of the lamp corresponding to the particular color,
C is the desired total density of the print,
$a$ is the factor corresponding to the cross-effect of the two other color densities or the degree of the undercorrection,
$\alpha_1$ is the factor for the brightness sensitivity of the eye to the corresponding color, and the index numbers $i=1, 2, 3$ each indicate one of the primary colors red, green or blue.

As a further normalization condition it is required that the sum of all factors $\alpha_1$ for the brightness sensitivity of the eye is equal to one and that the color densities add linearly.

It is assumed that $\theta_1$ (and therefore $\log \theta_1$ will remain constant for the time of illumination.

In the instrumentation, a secondary electron multiplier is to be used whose photo current $i_1$ is proportional to the print intensity $I_1$ over the operating range.

Figures 1, 3:
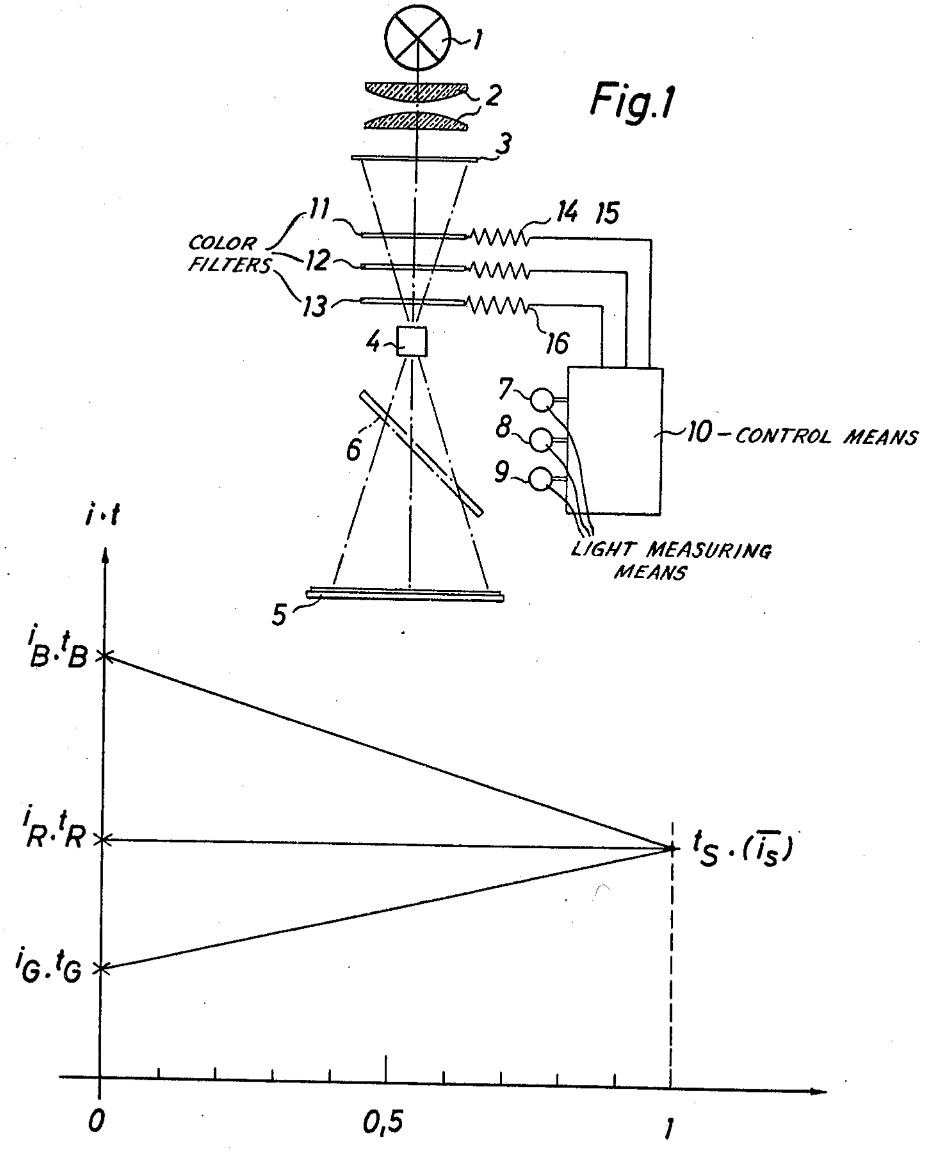
FIG. 1 is a fundamental representation of a printer equipped according to this invention.
FIG. 3 is a diagram showing a plot of the amount of light on the positive plotted against the degree of undercorrection.

The instrumentation will now be described:

In FIG. 1 reference numeral 1 indicates a light source which emits light in all three additive primary colors in approximately equal amounts. The light from this light source is impinged by means of a double condenser 2 on a negative 3, which is projected onto a print carrier 5 by a lens 4. A partially transparent mirror 6 is arranged between the lens 4 and the print carrier 5. This transmits part of the light emanating from the negative 3 to measuring means 7, 8, and 9. In this particular embodiment the measuring means consist of secondary electron multipliers, each of which is responsive to only one of the three colors because of preceding color filters. The arrangement is so devised that a representative part of the light for the total negative is impinged on each of the secondary electron multipliers. The three secondary electron multipliers are connected to a control arrangement 10 whose construction and function will be further explained below.

Subtractive color filters 11, 12, and 13 are also arranged in the path of the light. They may be moved into the path of the light by means of electromagnets 14, 15 and 16 which are in turn connected to the control arrangement 10. Thus by means of these electromagnets the illumination in each of the three fundamental colors may be separately terminated.

Figure 2:
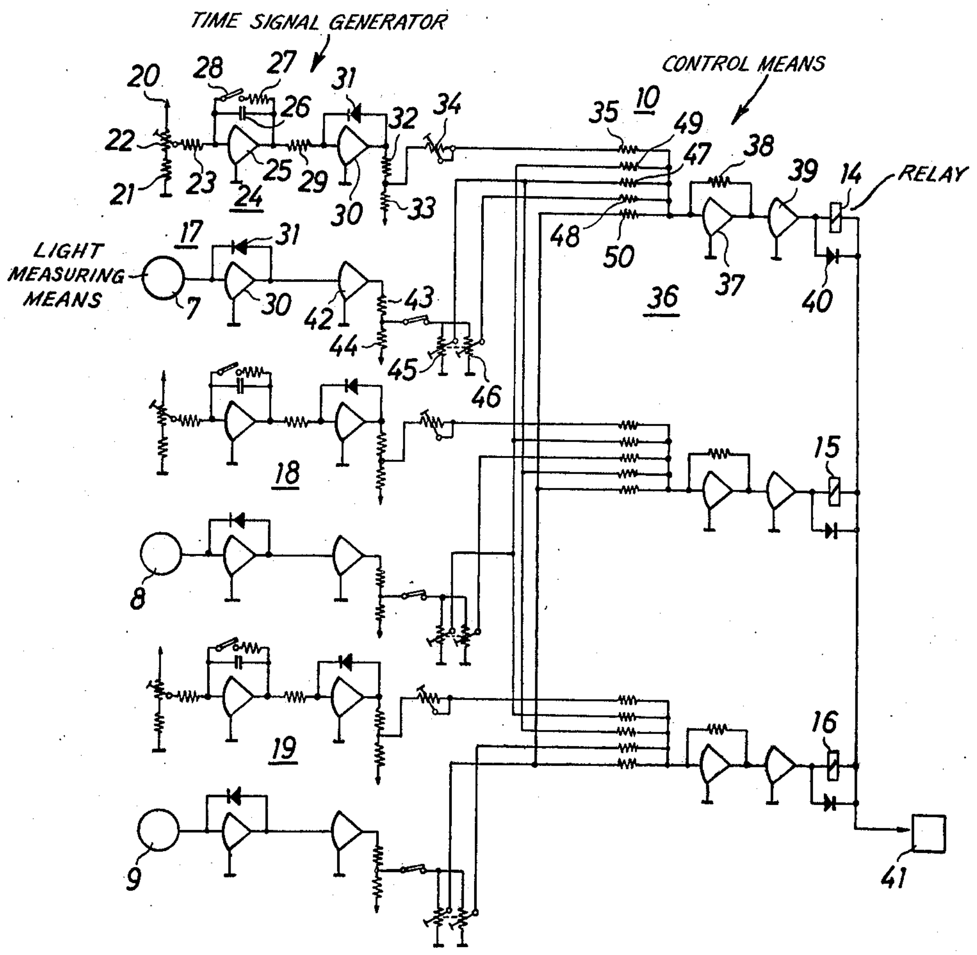
FIG. 2 is a circuit diagram for the control system of FIG. 1.

FIG. 2 shows the circuit diagram for the control arrangement 10. The control arrangement is constructed as an analog computer consisting of one type of building block throughout, namely so-called operational amplifiers. These conventional operational amplifiers may be used as integrators, lotharithmic amplifiers or adders, depending on the type of feedback used. For an integrator, the feedback means consist of a condenser, with a parallel arrangement of a resistor and a switching contact. The charging time of the condenser commences with the opening of the switching contact.

If the feedback means comprise a diode, the operational amplifier acts as a logarithmic amplifier. If the feedback means comprise a resistor and further parallel resistors are arranged at the input of the operational amplifier each of these input resistors having a voltage source in series with it and wherein it is desired to add these voltages, then the operational amplifier acts as an adder. The relationship of the input resistors to the feedback resistor determines the scale factor to be applied to each of the voltages to be added.

The control arrangement comprises in the main three equivalent color channels 17, 18 and 19. In each of the color channels a voltage divider is situated between a source of direct current voltage 20 and ground. This voltage divider consists of a fixed resistor 21 and an adjustable resistor 22. A further resistor 23 is connected to the movable arm of the adjustable resistor. An integrator 24 is connected to the further resistor 23. This consists, as described before, of an operational amplifier 25, and in parallel with this a condenser 26 in parallel with a resistor 27 and a switching contact 28. The integrator 24 is connected to a logarithmic amplifier 30 by means of a resistor 29. Feedback means for the logarithmic amplifier 30 comprises a diode 31. The logarithmic amplifier 30 is connected to a negative source of DC potential by means of resistor 32 and 33. A potentiometer 34, which serves to set the Schwarzschild exponent $p$, is connected to the common point of resistor 32 and 33. A resistor 35 is connected to the potentiometer 34. This preceding part of each color channel constitutes the time signal generating means. An adder 36 is connected to resistor 35. The adder 36 is constructed as described above of an operational amplifier 37 and a feedback resistor 38. The resistance of resistor 35 is half that of the feedback resistor 38. The output signal of the adder 36 is compared in comparator 39 with a fixed reference potential, for example ground. The comparator serves to energize relays 14 in dependence on the signal from the adder 36. A diode 40 is arranged in a conventional way across the relay. The relays 14, 15, and 16 are all connected to a common votage source 41 and are activated by the comparators of the corresponding color channel 39.

Parallel to the first part of the color channel, namely the time signal generating means, is a second branch which generates a signal in dependence on the density of the negative of the corresponding color. At the beginning of this branch of the color channel, which is also similarly constructed for all three colors, is the secondary electron multiplier 7, which is for example sensitive to the color red and does not react to any other color light from the negative. This secondary electron multiplier is connected to a logarithmic amplifier corresponding to the amplifiers 30, 31. This is followed by a storage arrangement 42 which serves to store the signal for a predetermined time period even if the secondary electron multiplier 7 is no longer illuminated. This type of storage arrangement constructed from semiconductor elements is conventional not subject of this invention. It is therefore not further described herein.

A voltage divider consisting of resistors 43 and 44 is connected between the output of the storage arrangement 42 and a source of negative voltage. At the top of this voltage divider are connected two parallel potentiometers 45 and 46 whose other side is connected to ground. The movable arms of the potentiometers 45 and 46 are coupled to cause movement in mutually opposite directions. The movable arm of the potentiometer 45 is connected to a resistor 47, as well as to corresponding resistors in the two other color channels. The other end of resistor 47 is connected to a terminal of resistor 35. The value of resistance 47 is chosen to differ from the feedback resistor 38 by the factor $\alpha_1$, that is by the factor corresponding to the brightness sensitivity of the eye for this particular color. The corresponding resistors in the other color channels have the same value. The movable arm of potentiometer 46 is connected to a resistor 48, whose other terminal is connected to the common point of resistors 35 and 47. This resistor has the same value as the feedback resistor 38.

Resistors 49 and 50 also have one terminal each connected to the common point of resistors 35, 47 and 48. Resistor 49 has a resistance which differs from the resistance 38 by a factor $1:\alpha_2$, that is it is a factor which takes into consideration the illuminating power of the second color, while resistor 50 corresponds to the illuminating power of the third color. The other terminal of resistor 49 is connected to the variable arm of a potentiometer in the second color channel which corresponds to the potentiometer 45 in the first color channel. Resistors corresponding to the resistor 49 are arranged in corresponding positions in the color channels 18 and 19. Resistor 50 is connected in a similar way to a potentiometer in the third color channel, which corresponds to the potentiometer 45 in the first color channel.

The method of operation of the arrangement described above is as follows:

Adjustment of the potentiometer 22 determines the steepness of the voltage rise at the integrators 24, which commences when the switch 28, which is closed when the equipment is at rest, is opened. This integrator thus generates a signal depending on time. The logarithm corresponding to the signal is generated by the logarithmic amplifier 30. This is combined by resistor 34 with the Schwarzschild exponent of the emulsion in the corresponding color of the light sensitive material. Thus the setting of potentiometer 22 corresponds to the basic sensitivity of the print material in the corresponding color.

The second part of the color channel 17 generates a signal which depends on the density of the negative in the corresponding color. The output of the secondary electron multiplier 7 is as discussed above, a measure of the print intensity I, and for constant $\theta$, a measure of the negative density N. The logarithm of the voltage is generated and retained in the storage 42. The two potentiometers 45 and 46 which are coupled in the opposite sense, serve to reflect the influence of the cross-effect factor $a$ from one color channel to the other color channel. For $a=0$ the variable arm of the potentiometer 46 is so adjusted that the whole voltage of the voltage divider 43 and 44 is applied to resistor 48. At the same time the variable arm of the potentiometer 45 is substantially connected to ground, and therefore generates no signal. In this position no cross-effect from one channel to the other exists and the print is compensated to neutral grey independent of the negative.

In the other extreme position in which the variable arm of the potentiometer 45 is connected to the voltage of the voltage divider 43 and 44 and the variable arm of the potentiometer 46 is connected to ground, the density of the negative in the color of this channel has no more influence on the lighting of the positive in the corresponding color than have the density of the negative in the two other colors. In this case the maximum undercorrection occurs or, to express it differently no correction at all. The result is then the same as would be obtained with a white lamp and an illumination control with a single photocell, wherein the photocell reacts to all three colors in approximately equal fashion. All values intermediate between these two extreme values may be adjusted strictly according to the theoretical equation.

The movable arms of potentiometers 45 and 46 are mechanically coupled to the movable arms of the correspondingly arranged potentiometers in the color channels 18 and 19, so that all potentiometers are adjusted to correspond to the adjustment of the potentiometers 45 and 46. In this way one adjustment adjusts the cross-effect factor $a$ for all three color channels.

The control signal for ending the illumination process in the color controlled by color channel 17 is also influenced by the potential at resistors 49 and 50, which potentials correspond to the intensity in the other color channels reduced by the cross-effect factor $a$. The adder 36 generates a signal in dependence on all of these values, which signal is compared to a fixed reference potential by comparator 39. After a predetermined magnitude is reached this activates the relay 14, which in turn results in the introduction of a filter into the path of the light, thus terminating the illumination in the corresponding color.

In channels 18 and 19 the control of the illumination takes place in the same fashion. The signals corresponding to the density of the negative in all colors must be available until the end of the longest illumination. The storage means 42 serves to retain these signals. This storage means may be eliminated if, for example, the printer is altered in such a fashion that the photocell continues to be illuminated even after the end of the illumination of the copy material. In an arrangement as shown in FIG. 1 this may for example be accomplished if the mirror 6 for diverting part of the measuring illumination precedes the color filters 11, 12 and 13 in the path of the light.

FIG. 3 shows a diagram illustrating the functioning of the present invention by showing a plot of the quantity of illumination in the single color as ordinates against the degree of undercorrection $a$ on the abscissa. On the ordinate axis, that is for $a=0$, are found the illuminations for a negative according to an illumination control following the neutral grey principle. With increasing undercorrection $a$ the long switching times are shortened while the short switching times are lengthened. This is done in such a way that the total density of the print remains constant. For an undercorrection $a=1$ there results an equal switching time $t_s$ (assuming that the basic calibration of the times generators was the same). This same switching time $t_s$ would also result if a pure white light were used and the length of illumination would depend on the total density only.

If different calibration times are used, curves of a similar character results. However these do not tend to a common end point, but split into three end points whose ordinate depend on the calibration time.

While the invention has been illustrated and described as embodied in a particular control system for a certain type of color printer, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. For a photo printer adapted to print a positive from a given color negative on print material sensitive to a plurality of colors: an illumination control system, comprising in combination, means for creating signals as a function of the individual negative density of each of a predetermined plurality of colors; illumination means for illuminating said print material in such a manner that the intensity of illumination of the print material in a color is a function of the density of the negative in said color; time signal generating means adapted to generate an illumination time signal as a function of time elapsed since the start of said illumination; a plurality of color signal generating means each adapted to generate an individual color signal at least in part a function of the difference in negative density between said color and at least one of said other colors; means for comparing each of said individual color signals and said illumination time signal, and generating a corresponding individual control signal whenever one of said individual color signals has a predetermined relationship to said illumination time signal; and means for terminating the illumination in each of said colors upon receipt of the corresponding individual control signal.

2. An illumination control system as set forth in claim 1 wherein said plurality of colors comprise three primary colors.

3. A system as set forth in claim 2 wherein each of said color signals is at least in part a function of the difference in negative density between said color and each of said other two colors.

4. A system as set forth in claim 3, wherein each of said color signal generating means comprises means for generating a signal corresponding to neutral gray compensation; and means for generating an undercorrection signal corresponding to a predetermined crosseffect factor multiplied by functions of said differences in negative density between said color and each of said other two colors.

5. A system as set forth in claim 4, also comprising means for externally setting said crosseffect factor to correspond to the degree of dominance of one color over the other colors in said negative, while the print density is kept constant.

6. A system as set forth in claim 5, wherein said time signal generating means comprise means for implementing the function:

$$p_1 \log t_1;\ p_2 \log t_2;\ p_3 \log t_3$$

and wherein said each of said color signal generating means comprises means for implementing the function:

$$N_1 - \log \theta_1 + C + a[\alpha_2(N_2 - N_1) + \alpha_3(N_3 - N_1)]$$

changed for implementation purposes to read:

$$(1-a) \log i_1 - a(\alpha_1 \log i_1 + \alpha_2 \log i_2 + \alpha_3 \log i_3) - a(\alpha_1 \log \theta_1 + \alpha_2 \log \theta_2 + \alpha_3 \log \theta_3) + a \log \theta_1 - C = 0$$

and equivalent functions for the other 2 colors, where:

$p_1$ is the Schwarzschild exponent,
$t_1$ the necessary time of illumination,
$N_1$ the density of the negative,
$\theta_1$ the brightness of the lamp corresponding to the particular color,
C the desired total density of the print,
$a$ the factor corresponding to the cross-effect of the two other color densities or the degree of the undercorrection,
$\alpha_1$ the factor for the brightness sensitivity of the eye to the corresponding color,
and the index numbers=1, 2, 3 each indicate one of the primary colors red, green or blue,
$i$ is a measured photocurrent corresponding to the print intensity of illumination in a given color.

7. A system as set forth in claim 6, wherein said time signal generating means and said color signal generating means comprise operational amplifiers.

8. A system as set forth in claim 1, wherein said means for creating signals as a function of the individual negative densities of each color comprise means for generating a photocurrent proportional to the print intensity of illumination in said color.

9. A system as set forth in claim 1, wherein said predetermined relationship is equality.

10. A system as set forth in claim 3, wherein said means for terminating the illumination comprise three subtractive filters, one for each color; and means for moving the corresponding filter into the illumination path upon receipt of the control signal.

11. A system as set forth in claim 1, also comprising means for storing said density signals until the completion of illumination in all of said colors.

12. Method for illumination control in a color photo printing process wherein a multicolored print corresponding to a multicolored negative is printed on color sensitive print material, comprising in combination, the steps of creating signals as a function of the negative density of each of a predetermined plurality of colors; illuminating said print material in such a manner that the intensity of illumination in a given color is a function of the negative density in said color; generating a time signal as a function of time elapsed from the start of said illuminating step; generating a plurality of individual color signals, each at least in part a function of the difference in negative density between the corresponding color and at least one of said other colors; comparing each of said color signals and said time signal and generating an individual control signal for each color when said time signal and the corresponding one of said color signals have a predetermined relationship; and terminating the illumination in said color upon receipt of the corresponding individual control signal.

13. A method as set forth in claim 12, wherein generating each of said color signals comprises generating a signal as a function of the negative density in a color; generating a further signal in dependence on the difference in negative density between said color and each of said other colors; externally setting a cross effect factor in such a manner as to correspond to the degree of dominance of one color over all other colors in said negative, while keeping the total density constant; generating an undercorrections signal as the product of said cross effect factor and said further signal; and generating said color signal as the sum of said density signal and said undercorrection signal.

14. A method as set forth in claim 12, wherein said step of generating a time signal comprises generating an individual time signal for each of said plurality of colors.

15. A method as set forth in claim 14, wherein generating an individual time signal comprises generating a signal proportional to the logarithm of elapsed time; and electrically multiplying said logarithm signal by the Schwarzschild exponent for the corresponding color.

16. A method as set forth in claim 12, also comprising the step of storing each of said density signals until completion of illumination in all said colors.

17. A method as set forth in claim 12, wherein said predetermined plurality of colors comprises the three primary colors.

References Cited

UNITED STATES PATENTS

| | | | |
|---|---|---|---|
| 2,981,791 | 4/1961 | Dixon | 178—5.2 |
| 3,417,196 | 12/1968 | Dreyfoos et al. | 178—5.2 |

ROBERT L. GRIFFIN, Primary Examiner

J. C. MARTIN, Assistant Examiner